Figure 1:
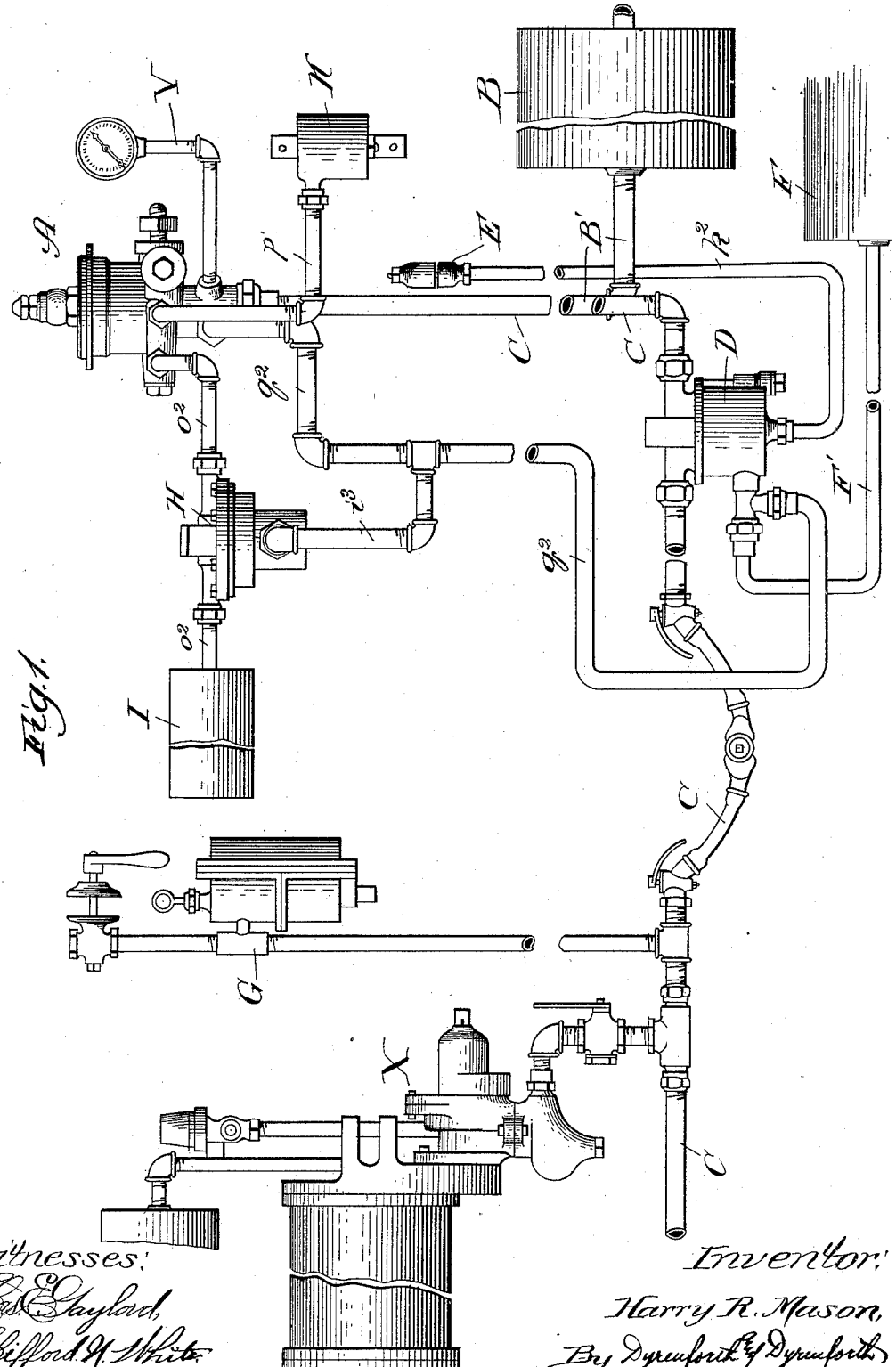

(No Model.) 7 Sheets—Sheet 3.
H. R. MASON.
TRAIN SIGNALING APPARATUS.

No. 463,065. Patented Nov. 10, 1891.

Witnesses:
Chas. E. Gaylord,
Clifford H. White.

Inventor:
Harry R. Mason,
By Dyrenforth & Dyrenforth,
Attys.

(No Model.) 7 Sheets—Sheet 4.
H. R. MASON.
TRAIN SIGNALING APPARATUS.
No. 463,065. Patented Nov. 10, 1891.
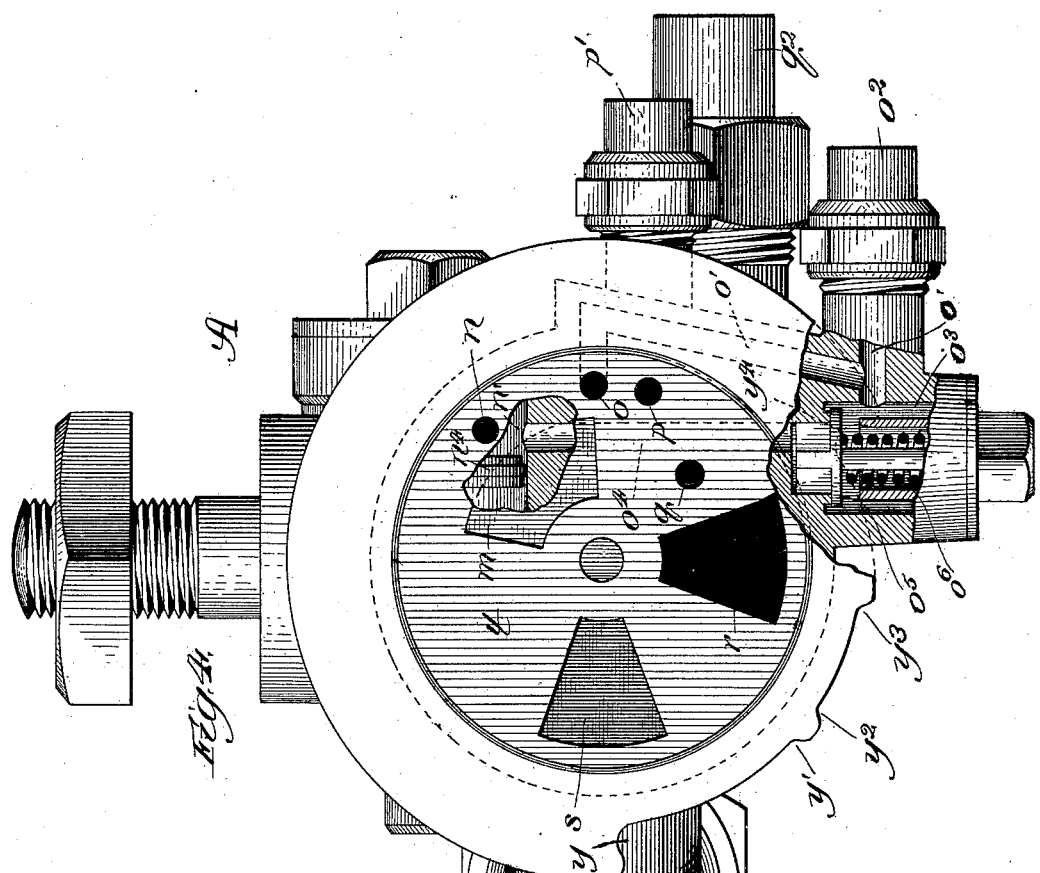
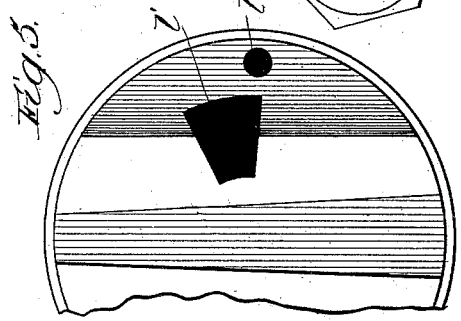
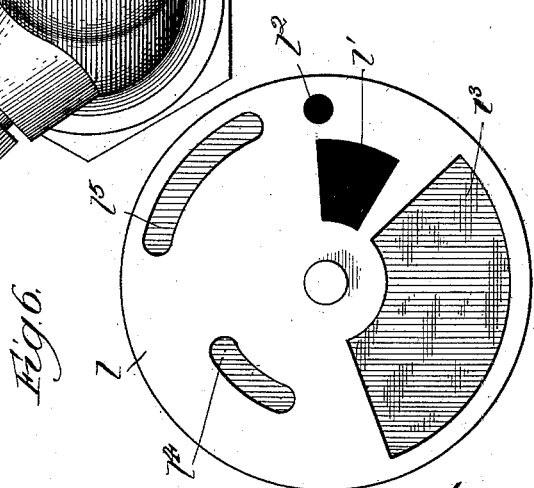
Witnesses:
Chas. E. Gaylord
Clifford N. White
Inventor:
Harry R. Mason,
By Dyrenforth & Dyrenforth
Attys.

(No Model.) 7 Sheets—Sheet 5.
H. R. MASON.
TRAIN SIGNALING APPARATUS.

No. 463,065. Patented Nov. 10, 1891.

Witnesses:
Chas. E. Gaylord,
Clifford N. White.

Inventor:
Harry R. Mason,
By Dyrenforth & Dyrenforth
Attys.

(No Model.) 7 Sheets—Sheet 6.

H. R. MASON.
TRAIN SIGNALING APPARATUS.

No. 463,065. Patented Nov. 10, 1891.

Witnesses:
Chas. E. Gaylord
Clifford N. White

Inventor:
Harry R. Mason,
By Dyrenforth & Dyrenforth
Attys (No Model.) 7 Sheets—Sheet 7.

H. R. MASON.
TRAIN SIGNALING APPARATUS.

No. 463,065. Patented Nov. 10, 1891.

Witnesses:
Chas. E. Gaylord
Clifford A. White

Inventor:
Harry R. Mason
By Dyrenforth & Dyrenforth,
Attys.

UNITED STATES PATENT OFFICE.

HARRY R. MASON, OF CHICAGO, ILLINOIS.

TRAIN SIGNALING APPARATUS.

SPECIFICATION forming part of Letters Patent No. 463,065, dated November 10, 1891.

Application filed September 25, 1891. Serial No. 406,840. (No model.)

*To all whom it may concern:*

Be it known that I, HARRY R. MASON, a citizen of the United States, residing at Chicago, in the county of Cook and State of Illinois, have invented a new and useful Improvement in Train Signaling Apparatus, of which the following is a specification.

My present invention is in the nature of an improvement upon train signaling apparatus described in Letters Patent of the United States No. 450,335, granted to me April 14, 1891, and relates to improvement in signaling apparatus for railway-trains, in which, generally stated, the signaling mechanism is actuated by impulses effected in the main train or brake-pipe by venting limited quantities of air therefrom at conductor's signaling-valves communicating directly with the brake-pipe and located upon cars of the train. In my said patent I have stated that when the handle of the engineer's brake-valve is turned from "release" to "running position" there is danger that the signal will be actuated unless special means are provided for obviating this difficulty. Means for preventing the signal from sounding when the engineer's brake-valve is turned from release to running position are shown and described in that patent, and the means therein described are found amply satisfactory for the purpose for which they are intended to be applied. I have improved upon this construction, however, and this improvement forms the subject of the present application, being adapted to operate in connection with a train of a large number of cars, as well as with a train of a lesser number, and in this particular it is found to be more efficacious under certain circumstances than the construction illustrated and described in my aforesaid Letters Patent.

My present object is to provide mechanism which will operate automatically to prevent the sounding of the signal in the signaling system above defined when the engineer's brake-valve is turned from release to running position, irrespective of the length of the train or the time consumed in turning the engineer's brake-valve. To accomplish my said object involves changes in minor details of the construction of the engineer's brake-valve shown and described in my aforesaid patent and the addition of features, all of which are hereinafter described.

Figure 2:
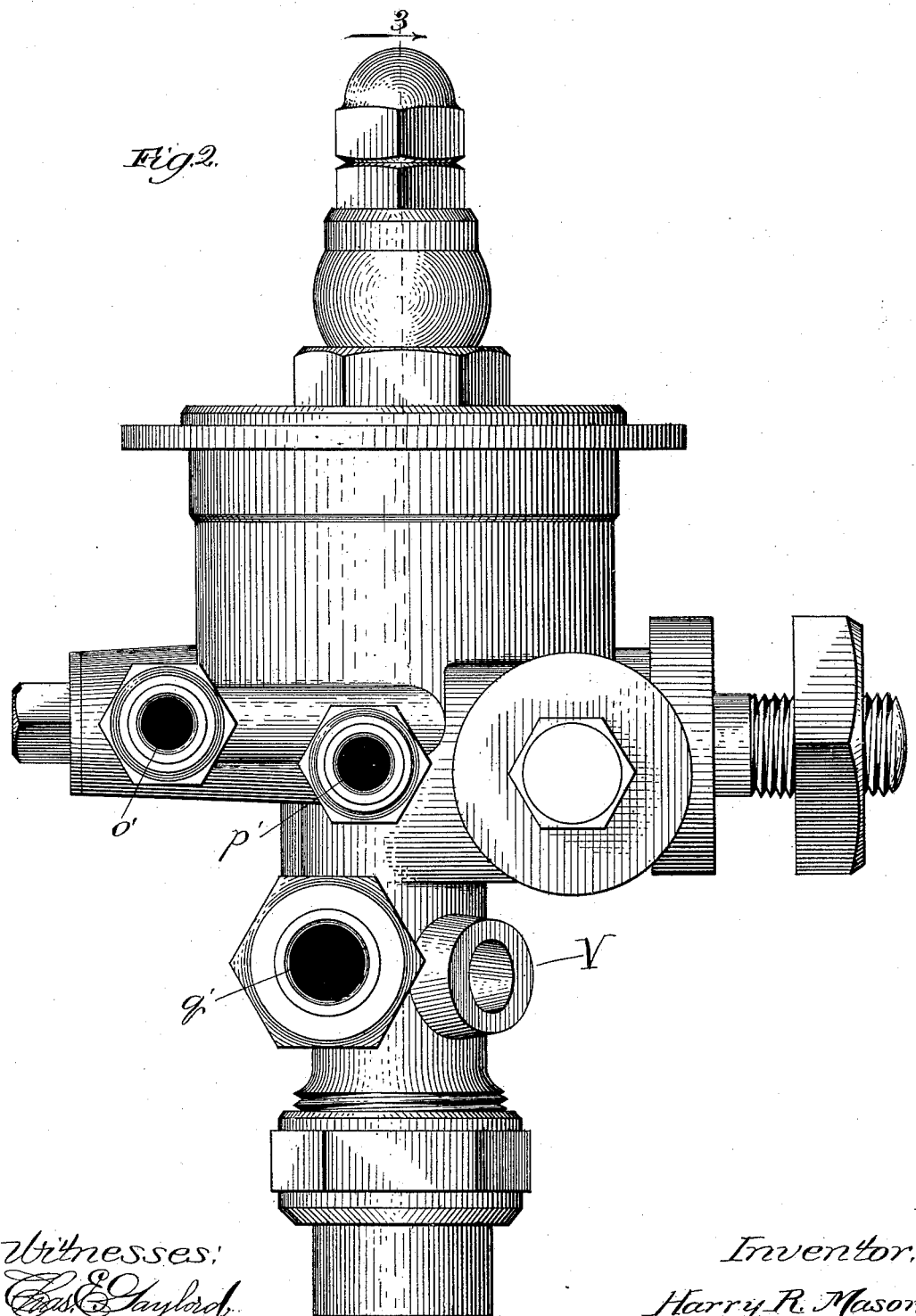
Figure 3:
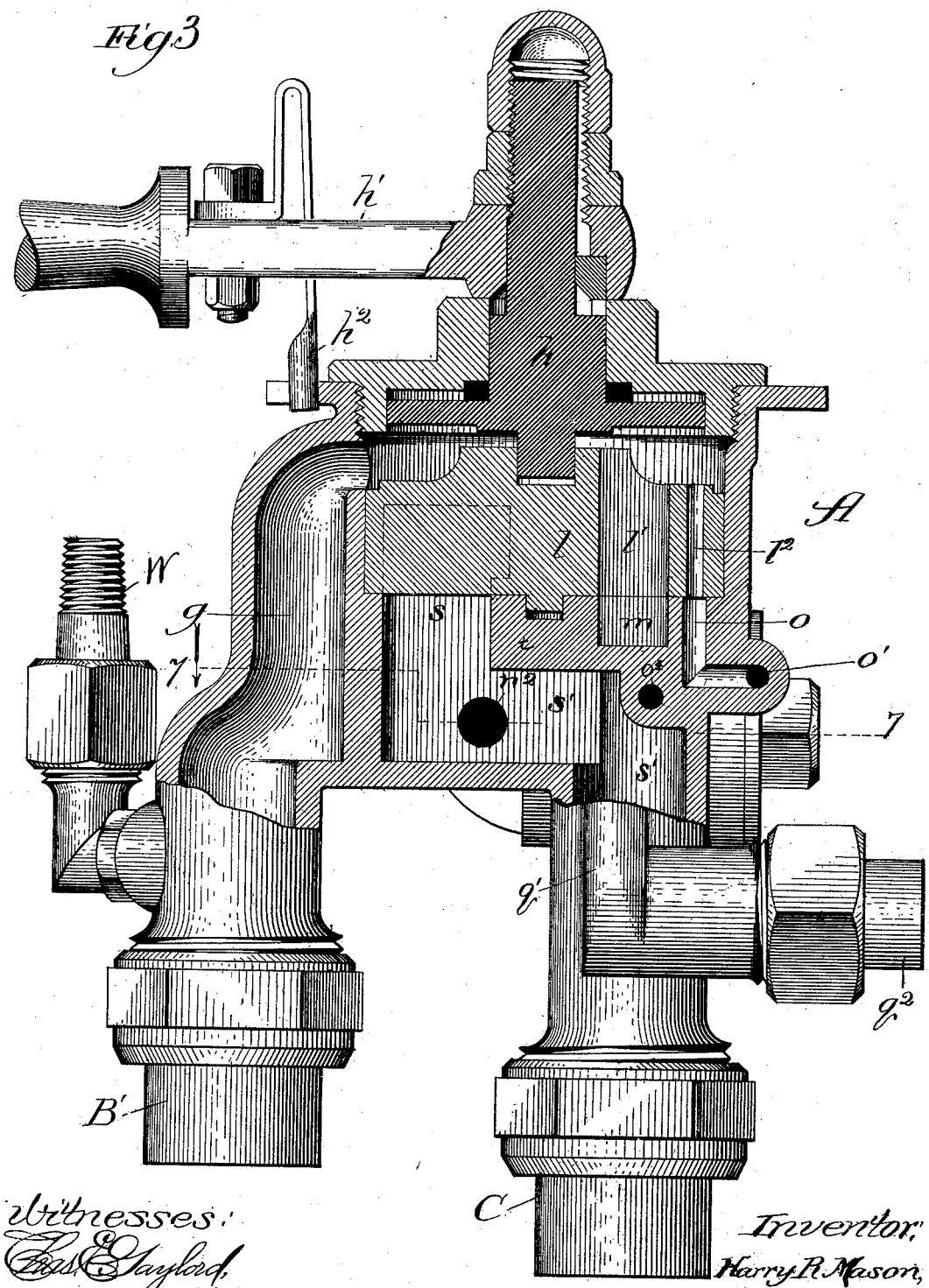
Figure 7:
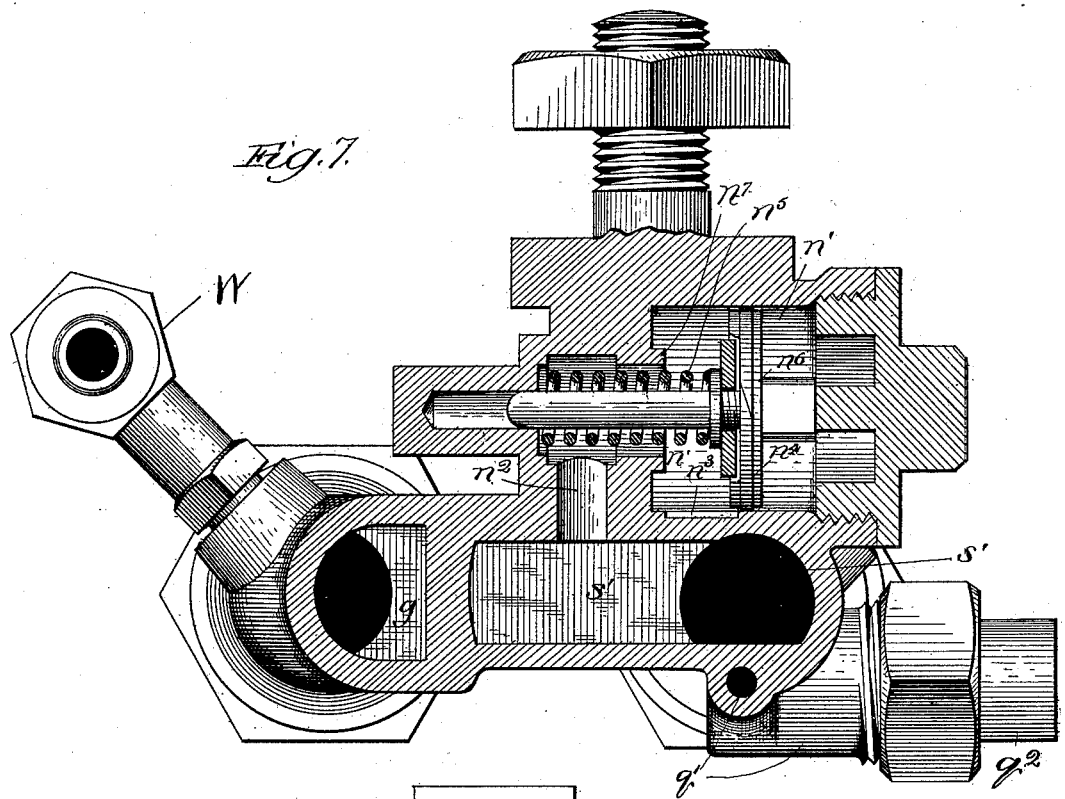
Figure 8:
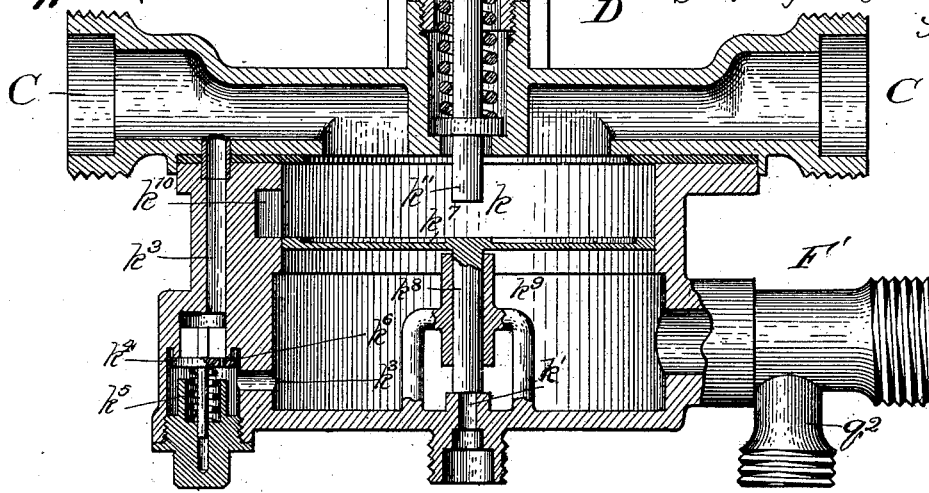
Figure 9:
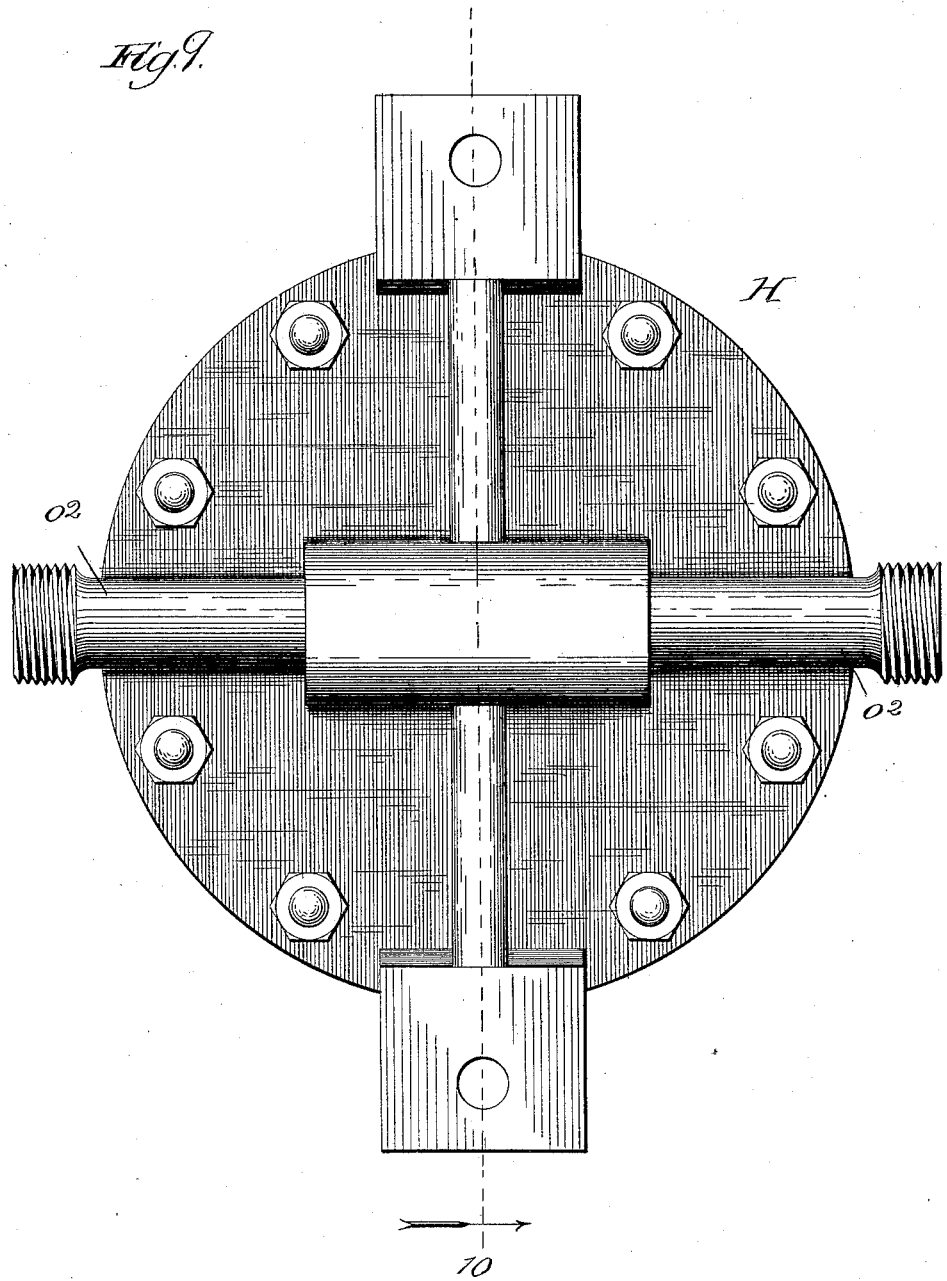
Figure 10:
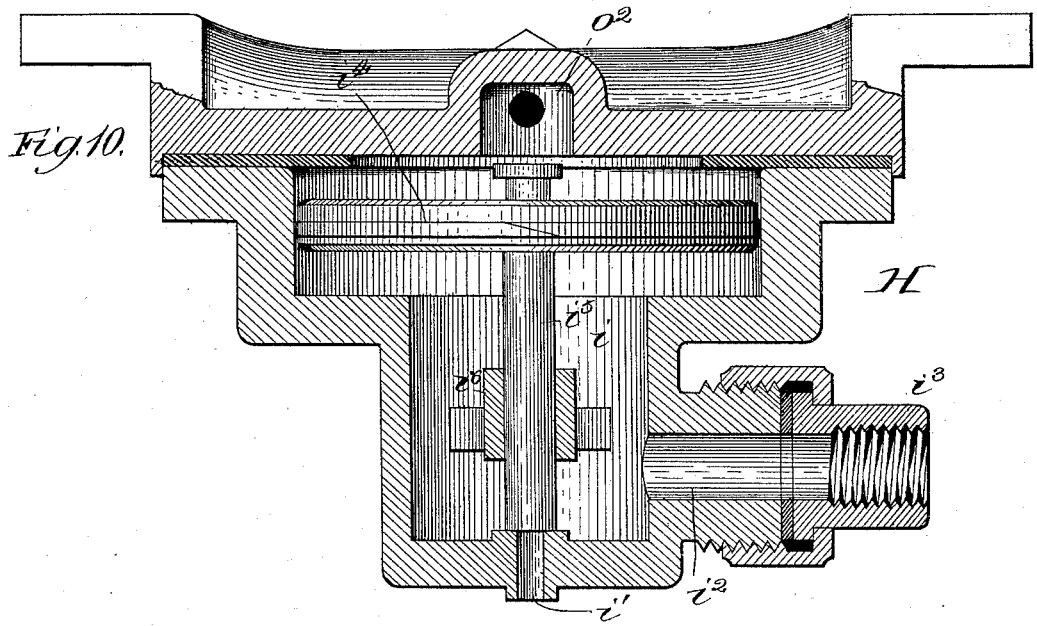
Figure 11:
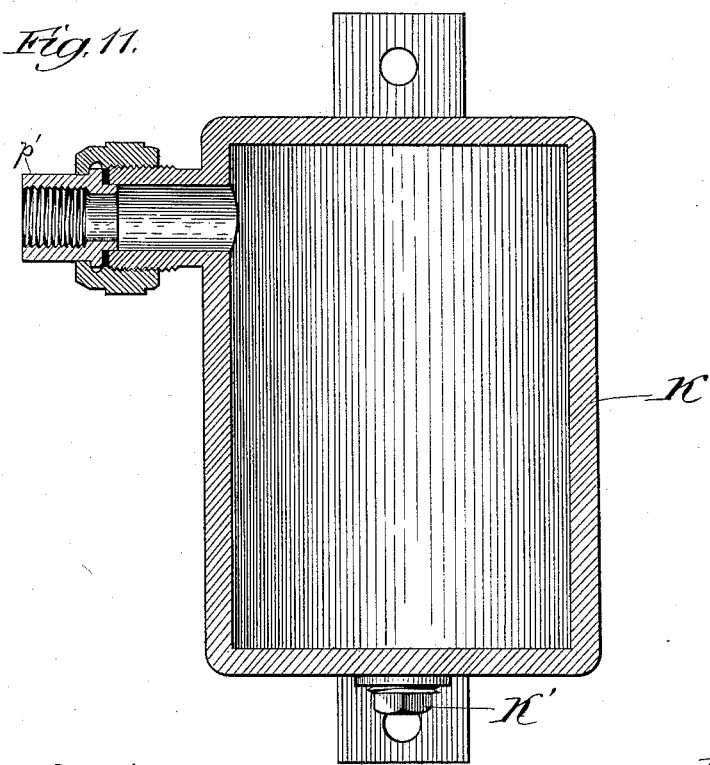

In the drawings, Figure 1 is a broken diagrammatic view of an air-brake and signaling system provided with my improvement, the features to the right of the coupling being upon the locomotive and those to the left upon each car if a passenger-train and upon the caboose if a freight-train; Fig. 2, an enlarged view in elevation of my improved engineer's brake-valve detached from its connections; Fig. 3, a broken partly sectional elevation of the same, the section being taken on line 3 of Fig. 2; Fig. 4, a top plan view of the valve-seat of the engineer's brake-valve, with parts broken away to expose details of the construction which would otherwise be hidden; Fig. 5, a top plan view of the regulating-valve portion of the engineer's brake-valve and which turns upon the valve-seat shown in Fig. 4; Fig. 6, a bottom plan view of the said regulating-valve; Fig. 7, a section taken on line 7 7 of Fig. 3 and viewed in the direction of the arrows; Fig. 8, an enlarged broken central sectional view of the signal-valve; Fig. 9, an enlarged top plan view of what I designate for want of a better term an "equalizing" or "pressure-relief" valve; Fig. 10, a section taken on line 10 of Fig. 9 and viewed in the direction of the arrow, and Fig. 11 a central section of what I term the "limiting-chamber" for the equalizing-reservoir.

A is the engineer's brake-valve; B, the main air-reservoir; C, the train-pipe; D, a signal-valve; E, a signal; F, a "supplemental" reservoir; G, a conductor's signaling-valve; H, an equalizing or pressure-relief valve; I, an equalizing-reservoir, and K a limiting-chamber.

The parts X shown in Fig. 1 are the brake applying and releasing mechanisms on each car of the train, which have no direct bearing upon the present application.

The valve-seat $t$ of the engineer's brake-valve is provided with a direct application and supply port $s$, communicating through a passage $s'$ with the train-pipe C, a direct-exhaust port $r$, communicating with the outside air, a service-stop exhaust-port $q$ communicating through a passage $q'$ with a pipe $q^2$, a port $p$ leading to a passage $p'$, and pipe $p^2$, communicating with the limiting-chamber K, a port $o$, leading to a passage $o'$, which communicates through a pipe $o^2$ with the equalizing-valve H and equalizing-reservoir I, and a service-feed or running-position port $n$. In the face of the valve-seat $t$ is a segmental recesss or cavity $m$. The ports and cavity $m$ should be in the relative positions shown in Fig. 4. The regulating valve $l$ is provided with a large passage $l'$ and a small passage $l^2$, extending through it in the relative positions shown. In the lower face of the regulating-valve $l$ are segmental recesses and cavities $l^3$, $l^4$, and $l^5$ of the relative dimensions and in the relative positions shown.

The service-feed or running-position port $n$ communicates with a chamber $n'$, (see Fig. 7,) and the chamber $n'$ communicates through a passage $n^2$ with the passage $s'$, which, as before stated, leads to the train-pipe. In the side wall of the chamber $n'$ is a longitudinally-extending groove $n^3$. In the chamber $n'$ is a valve $n^4$, maintained normally by a spring $n^5$ against a seat $n^6$. When thus seated, the valve is beyond the end of the groove $n^3$ and closes communication between the port $n$ and passage $s'$. The spring $n^5$ should in practice have a resistance of about twenty pounds, whereby the valve $n^4$ will be maintained in its normally-closed position until pressure in the passage $s'$ is more than twenty pounds below pressure, entering at the port $n$, as hereinafter described, when it will be forced in the direction of the seat $n^7$ and open communication around the valve through the groove $n^3$.

The function and operation of the valve $n^4$ are described and claimed in a pending application for Letters Patent, filed July 9, 1891, and bearing Serial No. 398,928.

The signaling-valve D is substantially the same as that shown and described in my aforesaid Letters Patent No. 450,335. It comprises a shell containing a piston-chamber $k$, opening at its upper end into the train-pipe C. At the center of the lower end of the chamber $k$ is an opening $k'$, communicating with a pipe $k^2$, which extends to the signal E. Communicating with the lower end of the chamber $k$ is a pipe F′, which leads to the supplemental reservoir F, and the pipe $q^2$, which, as before stated, leads to the service-stop port $q$ in the engineer's brake-valve and communicates near the signal-valve D with the pipe F′. Extending from the lower part of the chamber $k$ to the train-pipe C is a passage $k^3$. Interposed in the passage $k^3$ and seating in the direction of the train-pipe is a check-valve $k^4$, which is held normally to its seat by a spring $k^5$ of slight resistance. Through the valve $k^4$ is a small constantly-open passage $k^6$. In the chamber $k$ is a piston or movable diaphragm $k^7$, which at its circumference fits closely and slides against the inner wall of the chamber. The piston $k^7$ has a stem $k^8$, which moves in a guide $k^9$ and seats normally at its end over the outlet $k'$ to effectively close the latter. Between the normal position of the piston $k^7$ and top of the chamber $k$ is a groove $k^{10}$ in the chamber-wall. Centrally above the piston $k$ and normally out of contact therewith is a vertically-movable graduating-piston $k^{11}$, which is housed in the valve-shell and held normally at the lowest limits of its play by a graduating-spring $k^{12}$. The groove $k^{10}$ is of a length in excess of the thickness of the piston $k^7$. The train-pipe pressure-gage is attached to the valve at V and the main-reservoir pressure-gage at W.

The equalizing or pressure-relief valve H comprises a shell affording a chamber $i$ and communicating at its top with the pipe $o^2$, which, as before stated, extends to the engineer's brake-valve and terminates in the passage $o'$ leading to the port $o$. At the center of its lower end the valve-chamber $i$ is provided with an outlet-port $i'$ to the outside air. In the lower part of the chamber $i$ is an opening $i^2$, at which the valve communicates through a pipe $i^3$ with the pipe $q^2$. In the upper part of the chamber $i$ is a piston or movable abutment $i^4$, which fits at its circumference and moves against the inner wall of the shell. The piston $i^4$ is provided with a stem $i^5$, which moves in a guide $i^6$ and seats at its lower end over the outlet-opening $i'$ and maintains the said opening normally closed.

The equalizing-reservoir I is upon the end of the pipe $o^2$ and has no other inlet or outlet. The limiting-chamber K is upon the end of the pipe $p'$ and has no other outlet or inlet. It may be provided in its lower end with a removable and replaceable screw-plug K′ for draining it of accumulated moisture when desired.

In the shell of the engineer's brake-valve is a valve-chamber $o^3$, which communicates through a passage $o^4$ with the chamber $n'$ in front of the valve $n^4$—that is to say, on the same side of the latter as the port $n$. The chamber $o^3$ is provided also with an opening to the passage $o'$. In the chamber $o^3$ is a pressure-reducing valve $o^5$, which seats in the direction of the passage $o^4$ and is held normally closed or seated by a spring $o^6$.

The regulating-valve $l$ is upon a stem $h$, which extends through the top of the casing of the engineer's brake-valve and is provided with a handle $h'$. Upon the handle $h'$ is a spring-indicator catch $h^2$, which moves around and in contact with the upper rim of the shell of the engineer's brake-valve. Formed upon the said rim are stops $y, y', y^2, y^3$, and $y^4$, with which the indicator $h^2$ is caused to register and indicate the position of the regulating-valve upon its seat $t$. When the spring $h^2$ is turned to the stop $y$, the valve is at release position, wherein air from the main reservoir B passes from the pipe B′ through the passage $g$ to the top of the regulating-valve, thence down through the opening $l'$ to the groove $m$, and thence through the groove $l^3$ to the port $s$ and direct to the train-pipe. When in this position the groove $l^4$ is blanked, the groove $l^5$ registers with the ports $r p$, the passage $l^2$ registers with the port $o$, and the port $n$ is blanked. Thus air will also pass down through the passage $l^2$ to the passage $o'$, and thence to the equalizing-valve H and reservoir I. The air passing to the train-pipe C fills that pipe and all reservoirs upon cars connected therewith up to about seventy pounds' pressure. The reservoir F will be filled with substantially the same pressure, which will pass to it from the train-pipe through the channel $k^3$ (opening the check-valve $k^6$) and pipe F′. When the pressure is established, the same force substantially will be exerted against opposite sides of the diaphragm $k^7$ and the check-valve $k^4$ will close, leaving only the small open passage $k^6$ to equalize slight variations of pressure on opposite sides of the diaphragm $k^7$, which may be due to ordinary leakage in the system. The diaphragm $k^7$ in the valve D will thus be maintained in the position shown in Fig. 8, with its stem $k^8$ closing the outlet $k'$ to the signal. As the pressure passes into the pipe F′ it also fills the pipe $q^2$, and through the latter the pipe $i^3$, which extends to the equalizing-valve H at the under side of the piston $i^4$. The air passing through the opening $l^2$ in the regulating-valve and port $o$ fills the valve H over the piston $i^4$, and the reservoir I also, with substantially seventy pounds pressure. Thus the force exerted against opposite sides of the piston $i^4$ by the air in the pipes $o^2$ and $i^2$, respectively, will be substantially equal and cause the stem $i^5$ to maintain the outlet-opening $i'$ closed. The groove $l^5$ in the regulating-valve $l$, registering with the ports $p\ r$, as described, opens the limiting-chamber K to the outside air, whereby it is vented of its pressure.

It will be understood that the port $q$ being blanked will prevent the escape of air from the pipe $q^2$ through the engineer's brake-valve, and the port $n$ being blanked no pressure will enter the chamber $n'$ through that channel. The check-valve $o^5$ in the chamber $o^3$ will prevent pressure passing from the passage $o'$ to the passage $o^4$ and chamber $n'$, and the valve $n^4$ will be maintained closed by its spring $n^5$ and the pressure against it of air from the passage $s'$ through $n^2$.

When the indicator $h^2$ is turned to the stop $y'$, the engineer's brake-valve is at running position. When the valve has reached this position, the passage $l'$ of the regulating-valve is blanked and the supply of air to the port $s$ cut off. Although the groove $l^4$ registers with the exhaust-port $r$, the said port and groove are virtually blanked, and the port $q$ is also blanked. The opening $l^2$ of the regulating-valve registers with the port $n$, and the chamber $n'$ in front of the valve $n^4$ will be charged with the main-reservoir pressure, and at the same time the passage $o^4$ will be charged with the same pressure.

In practice the spring $n^5$, governing the valve $n^4$, and the spring $o^6$, governing the valve $o^5$, will each be capable of withstanding about twenty pounds of pressure exerted against the respective valves in the direction to open them. The resistance of the spring $n^5$ permits the main-reservoir pressure to be raised by the pump to ninety pounds or twenty pounds above the pressure established in the train-pipe and its connections. This is desirable, as it permits an excessive pressure to be stored in the main reservoir for use in releasing brakes when the engineer's valve is turned to the release position before described. The train-pipe pressure of seventy pounds and spring-pressure of twenty pounds will cause the valve $n^4$ to be normally balanced against the pressure from the main reservoir. In case of leakage in the train-pipe, which will reduce its pressure below seventy pounds, the superior pressure from the main reservoir will force the valve $n^4$ backward to the groove $n^3$, when the passage of pressure through that groove around the said valve will quickly re-establish the pressure in the train-pipe. In case of a sudden great reduction of pressure, which might be caused by breakage in the system or the parting of a coupling between cars, the valve $n^4$ will be forced to its seat $n^7$ by the reservoir-pressure, and the latter thus prevented from escaping to exhaust itself.

As before stated, it is usual in practice to maintain about seventy pounds pressure throughout the train-pipe, and the pressure will be established by turning the engineer's valve to release position. It is obvious, however, that the air which may flow to the train-pipe from the main reservoir will be much greater in quantity in long trains than in short trains. Consequently the initial pressure established in long trains would be less than that in short trains, and if the valve is turned from release to running position before the pump has raised the main-reservoir pressure to ninety pounds, the additional pressure to raise the train-pipe to seventy pounds will have to flow through the valve $n^4$. The same reasons which may prevent the train-pipe pressure from being raised to the established limit while the valve is in release position would also prevent the pressure in the equalizing-reservoir from being raised to that limit. Therefore when pressure in the train-pipe is being raised through the valve $n^4$ it will also have to be raised in substantially the same way in the equalizing-reservoir to equalize the pressures on opposite sides of the diaphragm in the valve H. If this is not done, the pressure from the train-pipe against the under side of the piston $i^4$ will be greater than the pressure from the equalizing-reservoir above the said piston, and the latter will be raised and vent pressure from the train-pipe as fast as it is raised above that in the equalizing-reservoir. To prevent this difficulty from ever arising I provide the channel $o^4$ and reducing-valve $o^5$, above described, which will permit the same pressure to flow from the port $n$ to the equalizing-reservoir as can flow from the said port to the train-pipe.

As stated at the beginning of this specification, when the engineer's brake-valve is turned from release position to running position there is danger, particularly in long trains, that the signal will be sounded if this operation is effected too quickly. The reasons for this danger are that when the valve is turned from release position the flow of pressure to the train-pipe is suddenly cut off, and what may, for the want of a better reason, be called the "inertia" of the air that has passed into the train-pipe, will cause it momentarily to decrease in pressure at the forward end of the train. This creates a momentary impulse of reduction of pressure over the diaphragm $k^7$ in the signal-valve B, causing the sudden superior pressure from the supplemental reservoir F to raise said diaphragm (before the pressures can be equalized through the small open passage $k^6$) and open the outlet $k'$ to sound the signal.

In my present construction, as the valve is turned from release to running position, the groove $l^5$, after leaving the exhaust-port $r$, causes the ports $o$ and $p$ to be brought immediately into communication and remain so until the valve is brought to running position and afterward. Thus with the initial turning of the regulating-valve pressure from the equalizing-chamber I will flow through the ports $o\ p$ and groove $l^5$ to the limiting-chamber K. In practice the relative sizes of the reservoir I and chamber K may be such as to cause the flow from the former to fill the latter to reduce the pressure in the reservoir—say five pounds. This causes the superior pressure then suddenly exerted against the under side of the piston $i^4$ in the equalizing-valve H to raise the said piston and permit air to pass from the pipe $i^3$ to the outside air until the pressure has become a trifle less on the under side of the said piston than that above it, when the piston will be forced down again to close the outlet $i'$. The venting of pressure from the pipe $i^3$ produces a corresponding venting of the pipes $q^2$ F' and reservoir F, which are "behind" the signal-valve D, and this will cause the train-pipe pressure C to be higher than that in the reservoir F and exert itself against the diaphragm $k^7$ to maintain the outlet $k'$ to the signal closed. The pressures on opposite sides of the diaphragm $k^7$, however, will be quickly brought to an equilibrium by the flow of pressure from the train-pipe through the passage $k^3$. When the pressure in the train-pipe and reservoir F have reduced to a degree slightly below that above the piston $i^4$ in the valve H, the latter will be closed, as before described, and the flow of pressure from the train-pipe and reservoir F shut off. It will be seen that the pressure substantially throughout the entire train-pipe C must be reduced to the extent stated before the closing of the outlet $i'$ can be effected. Consequently no matter how short or long the train is the pressure must be reduced in the manner stated and the outlet to the signal maintained closed. When the indicator is turned to the stop $y^2$, the engineer's brake-valve is "on lap." In this position all the ports are blanked, except the ports $o\ p$, which remain in communication through the groove $l^5$. This is the position to which the brake-valve is usually brought before a service or an emergency stop.

When the indicator $h^2$ is turned to the stop $y^3$, the engineer's brake-valve is at service-stop. When in this position the groove $l^4$ in the regulating-valve registers with the exhaust-port $r$ and service-stop inlet-port $q$. All the other ports are blanked, except $o$ and $n$, which are brought into communication by the groove $l^5$. When the engineer's brake-valve is in this position, pressure will retrogress from the train-pipe through the passage $k^3$ of the signal-valve D and pipe $q^2$ and escape at the exhaust-port $r$. At the same time the pressure in the supplemental reservoir F will vent through the pipe $q^2$ in the same manner. After the train-pipe pressure has been reduced twenty pounds and the pressure on the under side of the piston $i^4$ of the valve H to the same extent the pressure in the equalizing-reservoir will retrogress through the pipe $o^2$, passage $o'$, port $o$, groove $l^5$, and port $n$ to the chamber $n'$, and by exerting itself against the valve $n^4$ open the latter and escape through the groove $n^3$ to the train-pipe. This will relieve the pressure on the upper side of the piston $i^4$ and prevent more than a difference of twenty pounds on opposite sides thereof from being established. This is desirable for the reason that a too great difference of pressure on opposite sides of the piston $i^4$ is apt to effect it injuriously.

When the indicator $h^2$ is turned to the stop $y^4$, the engineer's brake-valve is at emergency-stop. In this position the ports $s$ and $r$ are brought into communication by the groove $l^3$, all other ports being closed. This produces a rapid venting of the train-pipe and its connections, and effects an immediate and forcible application of brakes. While in the emergency-stop the pressure is not relieved from the top of the piston in the valve H, such a stop occurs so rarely that it can make but little difference. It is the frequent strains upon the said piston which would be effected in service-stops that it is most desirable to guard against.

The drawings and foregoing description present the construction I prefer to employ. This construction, however, is to a large extent arbitrary, and is subject to modifications which would not depart from the spirit of my invention.

The valves shown and described are constructed with a view to economy, compactness, and durability; but valves of any other forms which in operation would be the substantial equivalents of those shown may obviously be employed in their stead.

My invention involves a new method for preventing the sounding of the signal when the engineer's valve is turned from release position and the supply of air to the train-pipe is checked, and this method consists in venting from the train-pipe and from behind the signal-valve a controlled or predetermined extent of pressure. The amount of air vented to effect this result will vary in trains of different lengths.

What I claim as new, and desire to secure by Letters Patent, is—

1. In a signal system for railway-trains, the combination, with the train-pipe and the engineer's brake-valve and signal-valve communicating therewith, of pressure-relief mechanism governed by the engineer's brake-valve and communicating with the signal-valve and operated by the said brake-valve in its movement from the release position to vent air from behind the signal-valve to an extent governed by the length of the train-pipe, substantially as described.

2. In a combined air-brake and a signaling system for railway-trains, the combination, with the train-pipe and signal-valve, of an engineer's brake-valve communicating with said pipe and signal-valve and operating when turned from release to running position to vent pressure from behind the signal-valve to a predetermined extent without reference to the time consumed in the said turning of the engineer's brake-valve, substantially as and for the purpose set forth.

3. In a signaling system for railway-trains, the combination, with the train-pipe and the engineer's brake-valve and signal-valve communicating therewith, of a pressure-relief valve having a chamber provided with an exhaust-opening, an opening communicating with the engineer's brake-valve and an opening communicating with the signal-valve and train-pipe, and a movable abutment in said chamber between the opening to the engineer's brake-valve and the other said openings and normally closing the said exhaust-opening, the said engineer's brake-valve operating when at release position to feed the pressure-relief valve and when moved from said position to vent pressure from the pressure-relief valve to move said abutment, and thus cause a corresponding venting of the signal-valve and train-pipe, substantially as and for the purpose set forth.

4. In an air-brake and signaling system for railway-trains, the combination, with the engineer's brake-valve, train-pipe, and signal-valve, of a reservoir I, communicating with the engineer's valve to be charged with pressure by said valve when it is turned to release position, a limiting-chamber K, communicating with the engineer's valve to be thrown into communication by said valve with the reservoir I to reduce the pressure in said reservoir when the said valve is turned from release position and to be cut off from the reservoir I and vented of pressure when the said valve is turned to release position, and a pressure-relief valve communicating with the reservoir I and with the signal-valve and train-pipe and operating when the pressure in the reservoir I is reduced, as described, to vent pressure from the signal-valve and train-pipe, substantially as and for the purpose set forth.

5. In an air-brake and signal system for railway-trains, the combination, with the main reservoir, engineer's brake-valve, and reservoir I, of a passage in the engineer's brake-valve between the main reservoir and reservoir I opened by turning said valve to release position and closed by turning said valve from release position, a second passage in the engineer's brake-valve between the main reservoir and reservoir I opened when the said valve is turned to running position, and a pressure-reducing valve in said second passage, substantially as and for the purpose set forth.

HARRY R. MASON.

In presence of—
J. N. HANSON,
M. J. FROST.